(12) United States Patent
Ogawa et al.

(10) Patent No.: US 6,722,342 B2
(45) Date of Patent: Apr. 20, 2004

(54) FUEL INJECTION CONTROL SYSTEM AND METHOD FOR INTERNAL COMBUSTION ENGINE AS WELL AS ENGINE CONTROL UNIT

(75) Inventors: Ken Ogawa, Saitama-ken (JP); Yasunori Ehara, Saitama-ken (JP); Kenji Hirose, Saitama-ken (JP); Hiroyuki Goto, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/267,874

(22) Filed: Oct. 10, 2002

(65) Prior Publication Data

US 2003/0070653 A1 Apr. 17, 2003

(30) Foreign Application Priority Data

Oct. 15, 2001 (JP) ........................................ 2001-317338

(51) Int. Cl.$^7$ .............................................. F02M 51/00
(52) U.S. Cl. ...................... 123/305; 123/472; 123/494; 701/104
(58) Field of Search ................................ 123/305, 435, 123/436, 445, 457, 472, 480, 494; 701/103, 104, 105

(56) References Cited

U.S. PATENT DOCUMENTS

| 4,939,658 | A | * | 7/1990 | Sekozawa et al. ........... 701/104 |
| 5,031,597 | A | * | 7/1991 | Monden ...................... 123/492 |
| 5,572,978 | A | * | 11/1996 | Ogawa ........................ 123/491 |
| 5,595,162 | A | * | 1/1997 | Iwai ............................ 123/491 |
| 5,601,064 | A | * | 2/1997 | Fujimoto et al. ............ 123/491 |
| 5,629,853 | A | * | 5/1997 | Ogawa et al. ........... 364/431.051 |
| 5,690,074 | A | * | 11/1997 | Ogawa ........................ 123/491 |
| 5,915,368 | A | * | 6/1999 | Ishida et al. ................. 123/675 |
| 2002/0133287 | A1 | * | 9/2002 | Dohta ........................ 701/104 |

FOREIGN PATENT DOCUMENTS

| JP | 137186 | * | 5/1994 | ........... F02D/41/04 |
| JP | 50897 | * | 2/1999 | ........... F02D/41/38 |
| JP | 218043 | * | 8/1999 | ........... F02D/41/04 |
| JP | 2001-280182 | | 10/2001 | |
| JP | 2002-227706 | | 8/2002 | |

* cited by examiner

Primary Examiner—Mahmoud Gimie
Assistant Examiner—Hai Huynh
(74) Attorney, Agent, or Firm—Arent Fox, PLLC

(57) ABSTRACT

A fuel injection control system and method for an internal combustion engine and an engine control unit, for accurately determining a fuel injection period and for performing accurate and optimum control of the actual fuel injection amount. An amount of fuel demanded by the engine is determined according to the detected operating conditions of the engine. An amount of fuel deposited on walls downstream of the fuel injection valve is determined according to the detected operating conditions. A net amount of fuel to be injected from the fuel injection valve is determined based on the determined demand amount of fuel and the determined deposited amount of fuel. Pressure of fuel to be injected from the fuel injection valve is determined. The fuel injection period is determined by correcting the determined net amount of fuel according to the determined pressure of fuel.

12 Claims, 11 Drawing Sheets

F I G. 6
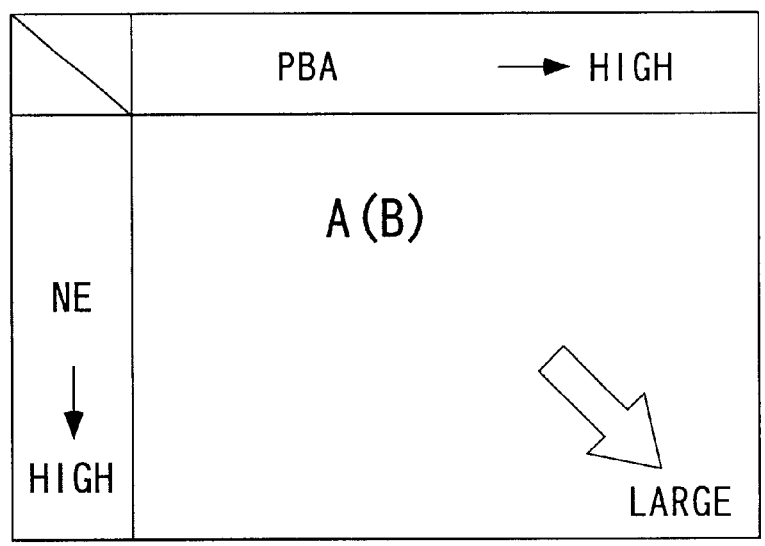
F I G. 7
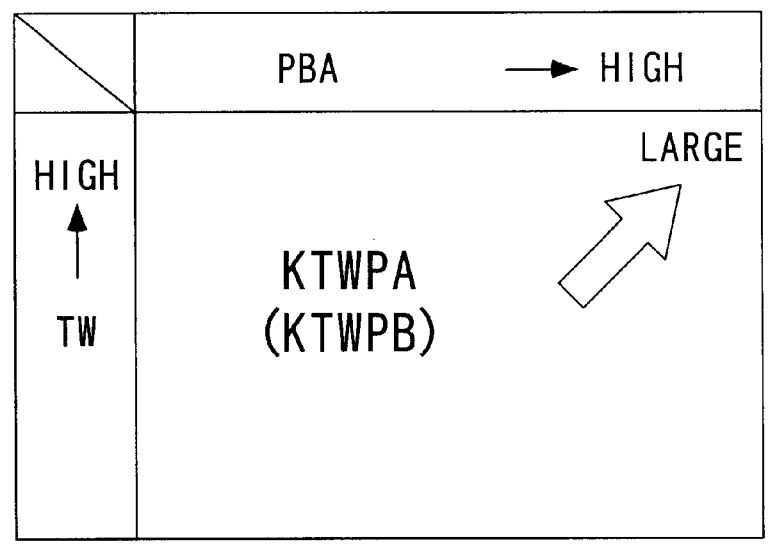

FUEL INJECTION CONTROL SYSTEM AND METHOD FOR INTERNAL COMBUSTION ENGINE AS WELL AS ENGINE CONTROL UNIT

BACKGROUND OF THE INVENTION

1. Field of the Invention

This invention relates to a fuel injection control system for an internal combustion engine, for controlling the amount of fuel injected from a fuel injection valve by a fuel injection period over which the valve is opened for fuel injection.

2. Description of the Prior Art

Conventionally, a fuel injection control system of the above-mentioned kind has been proposed e.g. in Japanese Laid-Open Patent Publication (Kokai) No. 7-166922 which discloses an internal combustion engine of an in-cylinder injection type which injects fuel directly into combustion chambers. In the proposed fuel injection control system, fuel behavior parameters indicative of behaviors of injected fuel are calculated and a fuel injection amount Fi is determined by using these fuel behavior parameters, in the following manner: A combustion-chamber fuel deposition ratio $\alpha c$ is retrieved from a map according to the engine temperature TE and the engine rotational speed NE. Further, a cylinder fuel deposition ratio $\alpha d$ is determined according to the engine temperature TE and the engine coolant temperature TW, and a gaseous fuel ratio $\beta c$ is calculated from the combustion-chamber fuel deposition ratio $\alpha c$ and the cylinder fuel deposition ratio $\alpha d$.

Then, a fuel evaporation ratio $\gamma c$ is retrieved from a map according to the engine temperature TE and the engine rotational speed NE, and an exhaust carry-off ratio $\gamma e$ is calculated from the fuel evaporation ratio $\gamma c$. Further, a gaseous fuel residual ratio $\beta k$ is retrieved from a map according to the engine temperature TE and the engine rotational speed NE. Then, the present value of a combustion-chamber gaseous fuel amount Fc is calculated from the engine rotational speed NE and an intake air amount Q. The fuel injection amount Fi is calculated from the present value of the combustion-chamber gaseous fuel amount Fc, the aforementioned fuel behavior parameters, and the immediately preceding value of a combustion-chamber deposited-fuel amount Mc. Further, a fuel injection period Tout is calculated from the fuel injection amount Fi.

Another internal combustion engine of the in-cylinder injection type is also known which injects fuel during a compression stroke and performs stratified combustion while controlling the air fuel ratio of a mixture to a far leaner value than a stoichiometric air-fuel ratio, under a very low load operating condition, such as idling. In this kind of internal combustion engine, fuel is supplied to a fuel injection valve in a state pressurized by a fuel pump and fuel injection is carried out during the compression stroke, so that the fuel pressure is set to a much higher level than when fuel injection is carried out during the intake stroke.

As described above, in the above conventional fuel injection control system, the fuel injection period Tout is calculated by using the engine temperature TE, the engine rotational speed NE, the engine coolant temperature TW, and the intake air amount Q as parameters. However, the amount of fuel actually injected into each cylinder varies with the fuel pressure, even if the fuel injection period Tout is not changed. For example, as the fuel pressure increases, the amount of actually injected fuel increases. In spite of this phenomenon, the conventional fuel injection control system only uses the above-mentioned parameters in calculation of the fuel injection period Tout, so that the fuel pressure cannot be reflected in the calculation, and hence the fuel injection period Tout cannot be properly calculated. Particularly in the case of the above in-cylinder injection type which performs stratified combustion, the fuel pressure changes largely e.g. immediately after fuel injection since the pressure is inherently set to a very high level, so that the actual fuel injection amount tends to largely deviate from the optimum amount. As a result, e.g. in the execution of feedback control of the air-fuel ratio, the fuel injection amount cannot be properly controlled with respect to a target air-fuel ratio, which degrades convergence of the air-fuel ratio control.

SUMMARY OF THE INVENTION

It is an object of the invention to provide a fuel injection control system and method for an internal combustion engine as well as an engine control unit, which are capable of accurately determining a fuel injection period such that fuel pressure and fuel deposition are appropriately reflected therein, thereby performing accurate and optimum control of the actual fuel injection amount.

To attain the above object, according to a first aspect of the present invention, there is provided a fuel injection control system for an internal combustion engine, for controlling the amount of fuel to be injected from a fuel injection valve, by a fuel injection period during which the fuel injection valve is opened for fuel injection, the fuel injection control system comprising:

operating condition-detecting means for detecting operating conditions of the engine;

demanded fuel amount-determining means for determining an amount of fuel demanded by the engine, according to the detected operating conditions of the engine;

deposited fuel amount-determining means for determining, out of an amount of fuel injected from the fuel injection valve, an amount of fuel deposited on walls downstream of the fuel injection valve, according to the detected operating conditions;

net fuel amount-determining means for determining a net amount of fuel to be injected from the fuel injection valve, based on the determined demanded amount of fuel and the determined deposited amount of fuel;

fuel pressure-determining means for determining pressure of fuel to be injected from the fuel injection valve; and fuel injection period-determining means for determining the fuel injection period by correcting the determined net amount of fuel according to the determined pressure of fuel.

According to this fuel injection control system, the amount of fuel demanded by the engine, and the amount of fuel deposited on walls downstream of the fuel injection valve out of the amount of fuel injected from the fuel injection valve are determined according to the operating conditions of the engine. Further, the net amount of fuel to be injected from the fuel injection valve is determined based on the determined demanded amount of fuel and the determined deposited amount of fuel. Then, by correcting the determined net amount of fuel according to the pressure of fuel, the fuel injection period is determined. The deposited fuel is burned within the combustion chamber after being once deposited on the walls downstream of the fuel injection valve, e.g. those of an intake port and a combustion chamber. Therefore, a proportion of an amount of burned fuel of the deposited fuel to the whole amount of the deposited fuel is inherently indifferent to the fuel pressure. Therefore, by determining the net amount of fuel to be injected based on the demanded amount of fuel and the deposited amount of fuel, as described above, without carrying out the correction dependent on the fuel pressure, it is possible to properly determine the net amount of fuel by causing the operating conditions of the engine to be reflected therein, while taking the deposited fuel amount into account and at the same time excluding the influence of fuel pressure. Further, the net amount of fuel thus determined is corrected according to the pressure of fuel to determine the fuel injection period. This makes it possible to properly compensate for fuel pressure-dependent variation in the amount of fuel actually injected from the fuel injection valve. As a result, according to the first aspect of the invention, it is possible to accurately determine the fuel injection period such that fuel pressure and fuel deposition are appropriately reflected therein, thereby perform accurate and optimum control of the actual fuel injection amount.

The engine includes a cylinder defining a combustion chamber therein, and it is preferred that the fuel injection valve is arranged such that fuel is injected directly into the combustion chamber of the cylinder.

As described above, an internal combustion engine of the in-cylinder injection type which injects fuel directly into the combustion chamber has characteristics that the fuel pressure is set to a very high level and undergoes a large variation. Therefore, according to this preferred embodiment, by causing the largely varying fuel pressure to be properly reflected in the determination of the fuel injection period, the advantageous effects described above can be effectively obtained for this type of engine.

More preferably, the fuel pressure-determining means includes supply fuel pressure-detecting means for detecting pressure of the fuel supplied to the fuel injection valve, and internal cylinder pressure-determining means for determining pressure within the combustion chamber, and determines the pressure of fuel as a difference between the pressure of fuel detected by the fuel pressure-detecting means and the pressure within the combustion chamber determined by the internal cylinder pressure-determining means.

Further preferably, the internal cylinder pressure-determining means includes crank angle-detecting means for detecting a crank angle of the engine, and determines the pressure within the combustion chamber according to the detected crank angle.

To attain the above object, according to a second aspect of the invention, there is provided a fuel injection control method for an internal combustion engine, for controlling the amount of fuel to be injected from a fuel injection valve, by a fuel injection period during which the fuel injection valve is opened for fuel injection, the fuel injection control method comprising the steps of:
  detecting operating conditions of the engine;
  determining an amount of fuel demanded by the engine, according to the detected operating conditions of the engine;
  determining, out of an amount of fuel injected from the fuel injection valve, an amount of fuel deposited on walls downstream of the fuel injection valve, according to the detected operating conditions;
  determining a net amount of fuel to be injected from the fuel injection valve, based on the determined demanded amount of fuel and the determined deposited amount of fuel;
  determining pressure of fuel to be injected from the fuel injection valve; and
  determining the fuel injection period by correcting the determined net amount of fuel according to the determined pressure of fuel.

According to the second aspect of the invention, the same advantageous effects as provided by the first aspect of the invention can be obtained.

The engine includes a cylinder defining a combustion chamber therein, and it is preferred that the fuel injection valve is arranged such that fuel is injected directly into the combustion chamber of the cylinder.

According to this preferred embodiments, the same advantageous effects as provided by the corresponding preferred embodiment of the first aspect of the invention can be obtained.

More preferably, the step of determining the pressure of fuel includes the steps of detecting pressure of the fuel supplied to the fuel injection valve, determining pressure within the combustion chamber, and determining the pressure of fuel as a difference between the detected pressure of fuel and the determined pressure within the combustion chamber.

Further preferably, the step of determining the pressure within the combustion chamber includes detecting a crank angle of the engine, and determining the pressure within the combustion chamber according to the detected crank angle.

To attain the above object, according to a third aspect of the invention, there is provided an engine control unit including a control program for causing a computer to carry out fuel injection control for controlling an amount of fuel to be injected into an internal combustion engine from a fuel injection valve, by a fuel injection period during which the fuel injection valve is opened for fuel injection, wherein the control program causes the computer to detect operating conditions of the engine, determine an amount of fuel demanded by the engine, according to the detected operating conditions of the engine, determine, out of an amount of fuel injected from the fuel injection valve, an amount of fuel deposited on walls downstream of the fuel injection valve, according to the detected operating conditions, determine a net amount of fuel to be injected from the fuel injection valve, based on the determined demanded amount of fuel and the determined deposited amount of fuel, determine pressure of fuel to be injected from the fuel injection valve, and determine the fuel injection period by correcting the determined net amount of fuel according to the determined pressure of fuel.

According to the third aspect of the invention, the same advantageous effects as provided by the first aspect of the invention can be obtained.

The engine includes a cylinder defining a combustion chamber therein, and it is preferred that the fuel injection valve is arranged such that fuel is injected directly into the combustion chamber of the cylinder.

According to this preferred embodiment, the same advantageous effects as provided by the corresponding preferred embodiment of the first aspect of the invention can be obtained.

More preferably, when the control program causes the computer to determine the pressure of fuel, the control program causes the computer to detect pressure of the fuel supplied to the fuel injection valve, determine pressure within the combustion chamber, and determine the pressure of fuel as a difference between the detected pressure of fuel and the determined pressure within the combustion chamber.

Further preferably, when the control program causes the computer to determine the pressure within the combustion chamber, the control program causes the computer to detect a crank angle of the engine, and determine the pressure within the combustion chamber according to the detected crank angle.

The above and other objects, features, and advantages of the invention will become more apparent from the following detailed description taken in conjunction with the accompanying drawings.

BRIEF DESCRIPTION OF THE DRAWINGS

FIG. 6 shows a map for use in calculating a basic direct ratio A and a basic carry-off ratio B in the FIG. 5 process;

FIG. 7 shows a map for use in calculating coolant temperature-dependent correction coefficients KTWPA, KTWPB in the FIG. 5 process;

DETAILED DESCRIPTION OF THE PREFERRED EMBODIMENT

Figure 1:
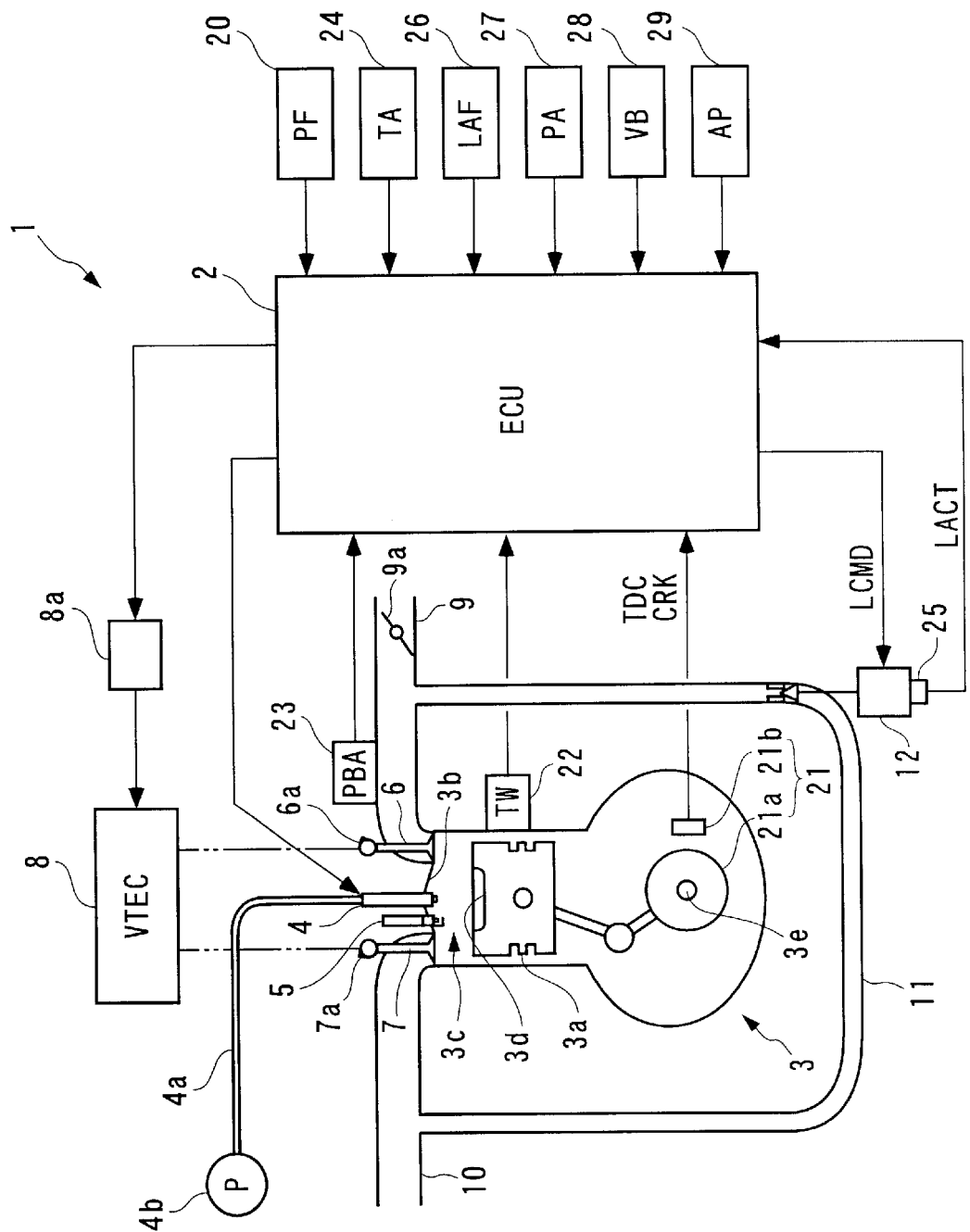
FIG. 1 is a block diagram schematically showing the arrangement of a fuel injection control system according to an embodiment of the invention and an internal combustion engine to which the fuel injection control system is applied.

The invention will now be described in detail with reference to the drawings showing an embodiment thereof. Referring first to FIG. 1, there is schematically shown the arrangement of a fuel injection control system according to an embodiment of the invention and an internal combustion engine to which the fuel injection control system is applied. As shown in the figure, the fuel injection control system 1 includes an ECU 2. The ECU 2 carries out fuel injection control and ignition timing control of the internal combustion engine 3 (hereinafter simply referred to as "the engine 3").

The engine 3 is e.g. a straight type four-cylinder gasoline engine for vehicles. The engine 3 has four cylinders in each of which (only one is shown) a combustion chamber 3c is defined between the piston 3a and a cylinder head 3b. The piston 3a has a top formed with a recess 3d in the center thereof. The cylinder head 3b has a fuel injection valve 4 (hereinafter simply referred to as "the injector 4") and a spark plug 5 mounted therein such that they face the combustion chamber 3c. The engine 3 is a so-called in-cylinder fuel injection type which injects fuel directly into the combustion chamber 3c.

The injector 4 is arranged in a central portion of a top wall of the combustion chamber 3c and connected to a high-pressure pump 4b via a fuel pipe 4a. Fuel is supplied from a fuel tank, not shown, and pressurized by the high-pressure pump 4b to a high level. Then, the pressurized fuel is supplied to the injector 4 in a state of the pressure thereof being regulated by a regulator, not shown. The fuel is injected from the injector 4 toward the recess 3d formed in the top surface of the piston 3a, and hits the recess 3d to form fuel jets. Particularly, in a stratified combustion mode, referred to hereinafter, most of the fuel injected from the injector 4 hits the recess 3d to form fuel jets.

A fuel pressure sensor 20 is mounted in a portion of the fuel pipe 4a in the vicinity of the injector 4. The fuel pressure sensor (fuel pressure-detecting means) 20 detects a fuel pressure PF of the fuel injected from the injector 4 and delivers a signal indicative of the sensed fuel pressure to the ECU 2. Further, the injector 4 is electrically connected to the ECU 2, and a fuel injection period Tout over which the injector 4 is opened for fuel injection and a fuel injection timing θinj1 (i.e. valve-opening timing and valve-closing timing) of the same are controlled by a drive signal delivered from the ECU 2, as described in detail hereinafter.

The spark plug 5 is also connected to the ECU 2, and a high voltage is applied to the spark plug 5 at an ignition timing θig indicated by a drive signal delivered from the ECU 2, for electric discharge, whereby an air-fuel mixture in the combustion chamber 3c is burned.

An intake cam 6a for opening and closing an intake valve 6 of each cylinder and an exhaust cam 7a for opening and closing an exhaust valve 7 of the same are each comprised of a low-speed cam and a high-speed cam having a higher cam nose than that of the low-speed cam. Further, the engine 3 is provided with a valve timing changeover mechanism 8 (hereinafter referred to as "the VTEC 8") and an oil pressure control valve 8a for controlling supply of oil pressure to the VTEC 8.

The VTEC 8 switches the intake cam 6a (or the exhaust cam 7a) of each cylinder between the low-speed cam and the high-speed cam, to thereby change the valve timing in which the intake valve 6 (or the exhaust valve 7) operates between a low-speed valve timing (hereinafter referred to as "LO.VT") and a high-speed valve timing (hereinafter referred to as "HI.VT"). More specifically, the VTEC 8 switches the valve timing to HI.VT by supply of oil pressure to the VTEC 8 via the oil pressure control valve 8a, and to LO.VT by cut-off of the supply of the oil pressure, under the control of the ECU 2.

Further, the valve timing is set to LO.VT when the combustion mode is a lean combustion mode included in a homogeneous combustion mode or the stratified combustion mode, all described in detail hereinafter, and to LO. VT or HI.VT when the same is a stoichiometric combustion mode included in the homogeneous combustion mode, also described in detail hereinafter. When the valve timing is switched to HI.VT, the intake valve 6 (or the exhaust valve 7) is opened and closed at an earlier timing than when the valve timing is held at LO.VT, and the amount of valve lift is also increased.

The engine 3 has a crankshaft 3e to which is mounted a magnet rotor 21a which constitutes a crank angle position sensor 21 together with an MRE (magnetic resistance element) pickup 21b. The crank angle position sensor 21 (operating condition-detecting means, crack angle-detecting means) delivers to the ECU 2 a CRK signal and a TDC signal, which are both pulse signals, in accordance with rotation of the crankshaft 3e.

Each pulse of the CRK signal (CRK signal pulse) is generated whenever the crankshaft rotates through a predetermined angle (e.g. 30 degrees). The ECU 2 determines a rotational speed NE (hereinafter referred to as "the engine rotational speed NE") of the engine 3, based on the CRK signal. The TDC signal (TDC signal pulse) is indicative of a predetermined crank angle position of each cylinder in the vicinity of a top dead center (TDC) position at the start of an intake stroke of the piston 3a in the cylinder, and each pulse of the TDC signal is generated whenever the crankshaft rotates through 180 degrees in the case of the four-cylinder engine 3 according to the embodiment. Further, the engine 3 is provided with a cylinder-discriminating sensor, not shown. The cylinder-discriminating sensor generates a cylinder-discriminating signal which is a pulse signal for discriminating each cylinder from the other ones to deliver the signal to the ECU 2. The ECU 2 determines which of the strokes and which crank angle position in the determined stroke each cylinder is in, based on the cylinder-discriminating signal, the CRK signal, and the TDC signal.

An engine coolant temperature sensor 22 (operating condition-detecting means) formed of a thermistor is mounted in the cylinder block of the engine 3. The engine coolant temperature sensor 22 senses an engine coolant temperature TW i.e. temperature of an engine coolant circulating through the cylinder block of the engine 3 and supplies an electric signal indicative of the sensed engine coolant temperature to the ECU 2.

At a location downstream of a throttle valve 9a arranged in an intermediate portion of an intake pipe 9 of the engine 3, an intake pipe absolute pressure sensor (operating condition-detecting means) 23 is inserted into the intake pipe 5. The intake pipe absolute pressure sensor 23 formed e.g. by a semiconductor pressure sensor senses an intake pipe absolute pressure PBA within the intake pipe 5, and delivers a signal indicative of the sensed intake pipe absolute pressure PBA to the ECU 2. Further, an intake air temperature sensor 24 is inserted into the intake pipe 9. The intake air temperature sensor (operating condition-detecting means) 24 formed of a thermistor senses an intake air temperature TA within the intake pipe 9 and delivers a signal indicative of the sensed intake air temperature TA to the ECU 2.

Further, the engine 3 has an EGR pipe 11 connecting between the intake pipe 9 and an exhaust pipe 10. Exhaust gases emitted from the engine 3 are recirculated toward an intake side of the engine 3 through the EGR pipe 11 to lower a combustion temperature within the combustion chamber 3c, whereby EGR operation is carried out to reduce NOx contained in the exhaust gases. The EGR pipe 11 has one end thereof connected to the intake pipe 9 at a location downstream of the throttle valve 9a and the other end thereof connected to the exhaust pipe 10 at a location upstream of a catalyst device, not shown.

The EGR pipe 11 has an EGR control valve 12 mounted therein. The EGR control valve 12 is formed by a linear solenoid valve. The amount of valve lift of the EGR control valve 12 is changed in response to a drive signal from the ECU 2, whereby the EGR pipe 11 is controlled to be opened and closed to control execution of the EGR operation and an EGR rate. The EGR control valve 12 is provided with a valve lift sensor 25 that senses an actual valve lift amount LACT of the EGR control valve 12 to deliver a signal indicative of the sensed valve lift amount to the ECU 2.

The ECU 2 calculates a target valve lift amount LCMD of the EGR control valve 12 according to the operating conditions of the engine 3 and controls the EGR control valve 12 such that the actual valve lift amount LACT becomes equal to the target valve lift amount LCMD, to thereby control the EGR rate.

A LAF sensor 26 is arranged at a location upstream of the catalyst device. The LAF sensor 26 is comprised of zirconia and platinum electrodes, and linearly detects the concentration of oxygen in exhaust gases in a broad air-fuel ratio range from a rich region richer than the stoichiometric ratio to a very lean region, to deliver a signal proportional to the sensed concentration of oxygen to the ECU 2.

Further, the ECU 2 is supplied with a signal indicative of atmospheric pressure PA sensed by an atmospheric pressure sensor 27 (operating condition-detecting means), a signal indicative of a voltage value VB of a battery, not shown, for supplying electric power to the injectors 4, which is sensed by a battery voltage sensor 28, and a signal indicative of a operation amount (hereinafter referred to as "accelerator-pedal opening") AP of an accelerator pedal, not shown, sensed by an accelerator opening degree sensor 29 (operating condition-detecting means).

The ECU 2 forms, in the present embodiment, operating condition-detecting means, demanded fuel amount-determining means, deposited fuel amount-determining means, net fuel amount-determining means, fuel pressure-determining means, fuel injection period-determining means, supply fuel pressure-detecting means, internal cylinder pressure-determining means, and crank angle-detecting means. The ECU 2 is formed by a microcomputer including a CPU, a RAM, a ROM, and an I/O interface, none of which are shown. The signals input from the sensors 20 to 29 to the ECU 2 are each delivered to the I/O interface for A/D conversion and waveform shaping, and then input into the CPU. The CPU carries out various kinds of arithmetic operations based on control programs read from the ROM, and various flags and calculation values read from the RAM.

More specifically, the ECU 2 controls the fuel injection period Tout and the fuel injection timing θ inj1, as described in detail hereinafter, to thereby execute a fuel injection control process including an air-fuel ratio control process. Further, the ECU 2 performs control of the ignition timing θig of the spark plug 5 in addition to the fuel injection control to thereby switch the combustion mode of the engine 3 to the stratified combustion mode for an extremely low-load operation of the engine 3, such as idling, and to the homogeneous combustion mode for operations of the engine 3 other than the extremely low-load operation. In the stratified combustion mode, fuel is injected into the combustion chamber 3c from the injector 5 at a fuel injection timing θinj, which is determined as described hereinafter, during a compression stroke and an air-fuel mixture which is extremely leaner (at an air-fuel ratio of e.g. 27 to 60) than the stoichiometric air-fuel ratio is unevenly distributed in the combustion chamber i.e. concentrated in the vicinity of the spark plug 5, and burned by stratified combustion. On the other hand, in the homogeneous combustion mode, fuel is injected into the combustion chamber 3c from the injector 4 at a fuel injection timing θinj, which is determined as described hereinafter, during an intake stroke, and a richer air-fuel mixture (having an air-fuel ratio of e.g. 12 to 27) than the mixture in the stratified combustion mode is homogeneously distributed in the combustion chamber 3c, and burned by homogeneous combustion.

Figure 2:
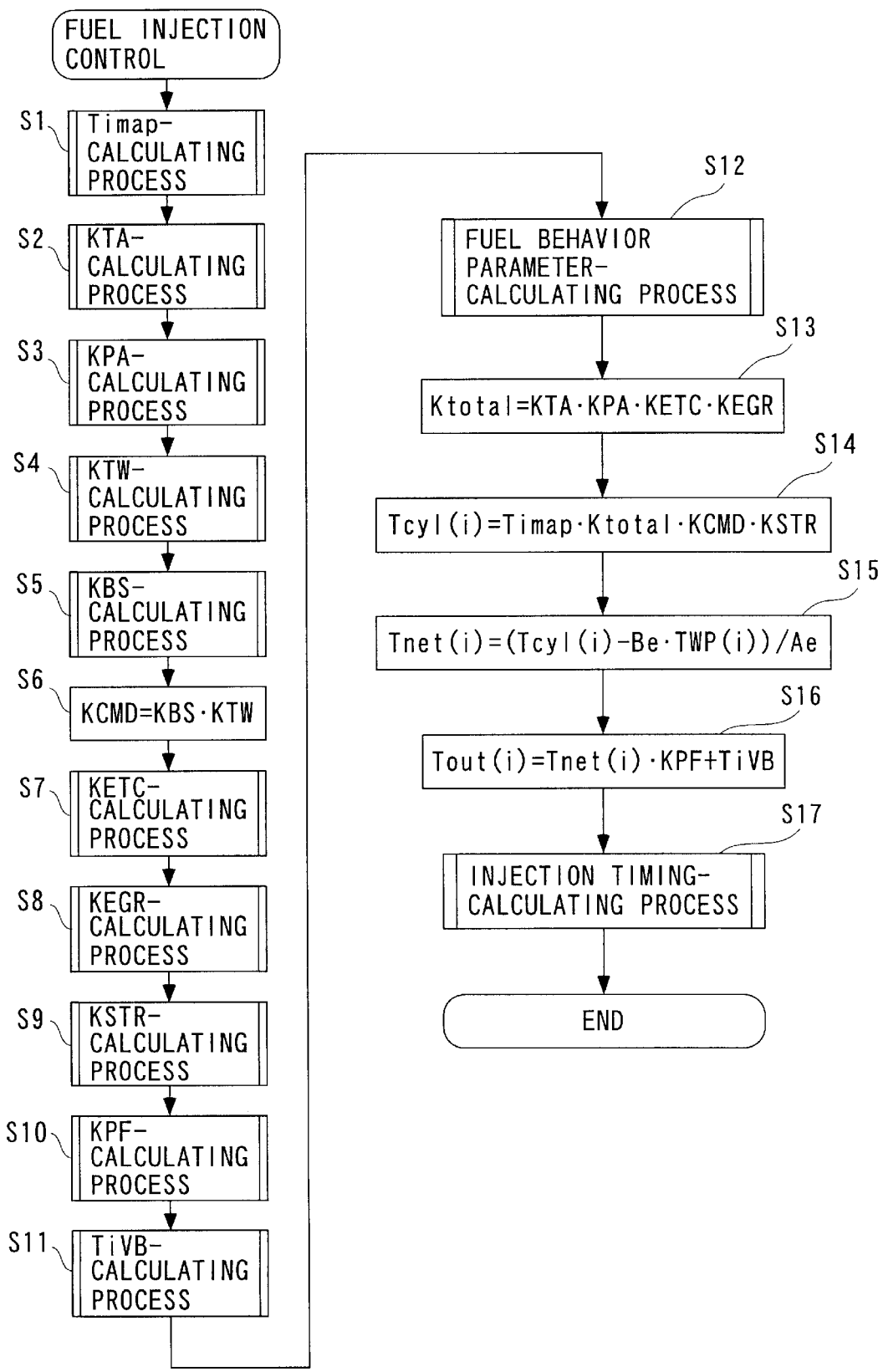
FIG. 2 is a flowchart showing a main routine of a fuel injection control process carried out by the FIG. 1 fuel injection control system.

In the following, the fuel injection control process including the air-fuel ratio control process, which is executed by the ECU 2, will be described in detail with reference to FIGS. 2 to 16. FIG. 2 shows a main routine for carrying out the fuel injection control process, which is executed by in synchronism with inputting of each TDC signal pulse. As described hereinafter, in the fuel injection control process, various correction coefficients are calculated (steps S2 to S13), and then the demanded fuel injection period TCYL, the net fuel injection period Tnet, the fuel injection period Tout, and the fuel injection timing θinj are calculated by using these correction coefficients (steps S14 to S16).

First, in a step S1, a Timap-calculating process is executed. In this process, a basic fuel injection period Timap is calculated by retrieval from a three-dimensional map (hereinafter simply referred to as "the map") according to the engine rotational speed NE and the intake pipe absolute pressure PBA.

Then, the program proceeds to a step S2, wherein a KTA-calculating process is executed. In this process, an intake air temperature-dependent correction coefficient KTA is calculated by retrieval from a table, not shown, according to the intake air temperature TA.

Then, the program proceeds to a step S3, wherein a KPA-calculating process is executed. In the process, an atmospheric pressure-dependent correction coefficient KPA is calculated by retrieval from a table, not shown, according to the atmospheric pressure PA.

Then, the program proceeds to a step S4, wherein a KTW-calculating process is executed. In this process, a coolant temperature-dependent correction coefficient KTW is calculated by retrieval from a map, not shown, according to the engine coolant temperature TW and the intake pipe absolute pressure PBA.

Then, the program proceeds to a step S5, wherein a KBS-calculating process is executed. In this process, first, a demanded torque PME is calculated by retrieval from a map, not shown, according to the engine rotational speed NE and the accelerator-pedal opening AP. Thereafter, a basic target air-fuel ratio coefficient KBS is calculated by retrieval from a map, not shown, according to the engine rotational speed NE and the demanded torque PME.

Then, the program proceeds to a step S6, wherein the basic target air-fuel ratio coefficient KBS determined in the step S5 is multiplied by the coolant temperature-dependent correction coefficient KTW determined in the step S4, to thereby calculate a final target air-fuel ratio coefficient KCMD. In other words, the final target air-fuel ratio coefficient KCMD is calculated by correcting the basic target air-fuel ratio coefficient KBS in accordance with the engine coolant temperature TW and the intake pipe absolute pressure PBA. The basic target air-fuel ratio coefficient KBS and the final target air-fuel ratio coefficient KCMD are each expressed as an equivalent ratio proportional to the reciprocal of the air-fuel ratio A/F.

Then, the program proceeds to a step S7, wherein a KETC-calculating process is executed. In this process, a charging efficiency-dependent correction coefficient KETC is calculated by retrieval from a table, not shown, according to the final target air-fuel ratio coefficient KCMD determined in the step S6. The charging efficiency-dependent correction coefficient KETC compensates for changes in charging efficiency due to changes in the air-fuel ratio A/F.

Next, the program proceeds to a step S8, wherein a KEGR-calculating process is executed. In this process, an EGR-dependent correction coefficient KEGR is determined in the following manner. First, a basic EGR-dependent correction coefficient KEGRm is calculated by retrieval from a map, not shown, according to the demanded torque PME determined in the step S5 and the engine rotational speed NE. Then, a lift amount-dependent correction coefficient KEGl is calculated based on the target valve lift amount LCMD of the EGR control valve 12 and the actual valve lift amount LACT detected by the valve lift sensor 25.

Further, an intake pipe absolute pressure-dependent correction coefficient KEGRp is determined based on the intake pipe absolute pressure PBA and a map value PBAm of the intake pipe absolute pressure. Then, the basic EGR-dependent correction coefficient KEGRm is multiplied by the lift amount-dependent correction coefficient KEGl and the intake pipe absolute pressure-dependent correction coefficient KEGRp to calculate the EGR-dependent correction coefficient KEGR (KEGR=KEGRm·KEGl·KEGRp). The EGR-dependent correction coefficient KEGR thus determined compensates for changes in the amount of intake air caused by changes in the EGR rate.

Then, the program proceeds to a step 9, wherein a KSTR-calculating process is executed. In this process, a feedback correction coefficient KSTR is calculated by an adaptive controller of self-turning regulator type, not shown, according to the signal from the LAF sensor 26. The feedback correction coefficient KSTR is applied to the basic fuel injection period Timap for dynamically compensating for a delay in the actual air-fuel ratio becoming the target air-fuel rate due to a delay in the response of a fuel injection system, to thereby improve convergence of the air-fuel ratio feedback control.

Figure 3:
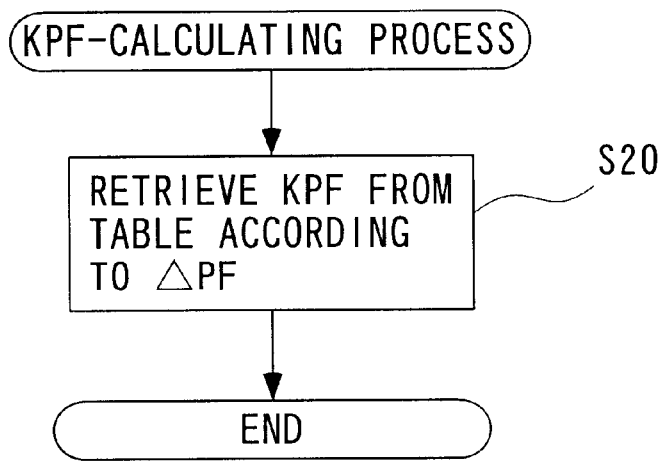
FIG. 3 is a flowchart showing a subroutine for carrying out a KPF-calculating process which is executed in a step S10 in FIG. 2.
Figure 4:
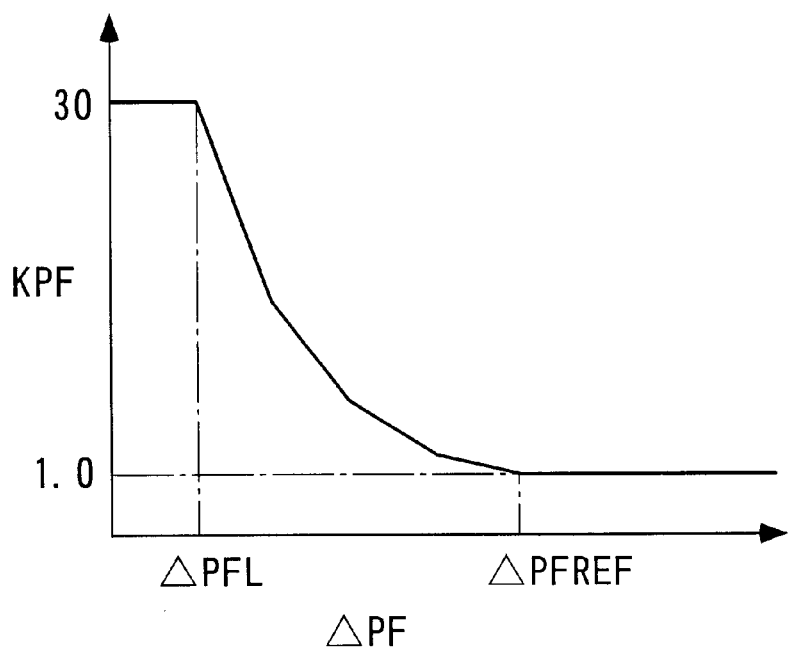
FIG. 4 shows an example of a APF–KPF table for use in the FIG. 3 KPF-calculating process.

Then, the program proceeds to a step S10, wherein a KPF-calculating process is executed. In this process, as shown in FIG. 3, in a step S20, a fuel pressure-dependent correction coefficient KPF is calculated by retrieval from a ÄPF–KPF table shown in FIG. 4 according to a differential pressure ÄPF (=PF−PCYL) between the fuel pressure PF and an internal cylinder pressure (pressure within the cylinder) PCYL, followed by terminating the program. In this case, the internal cylinder pressure PCYL is estimated by retrieval from a table, not shown, according to the crank angle position of a corresponding cylinder. It should be noted that the method of determining the internal cylinder pressure PCYL is not limited to this, but an internal cylinder pressure sensor may be mounted to the engine 3 for directly detecting the internal cylinder pressure PCYL.

In the ÄPF–KPF table, the fuel pressure-dependent correction coefficient KPF is set to a value of 30 in a range where the differential pressure ÄPF is equal to or lower than a first predetermined value ÄPFL (e.g. 0.03 MPa), and to a value of 1.0 in a range where the differential pressure ÄPF is equal to or higher than a second predetermined value ÄPFREF (e.g. 10 MPa) higher than the first predetermined value ÄPFL. Further, when the differential pressure ÄPF is in a range between ÄPFL and ÄPFREF (ÄPFL<ÄPF<ÄPFREF), the fuel pressure-dependent correction coefficient KPF is set such that it becomes smaller as the differential pressure ÄPF is higher. The reason why the fuel pressure-dependent correction coefficient KPF is thus set within the range between ÄPFL and ÄPFREF (ÄPFL<ÄPF<ÄPFREF) is that when the injector 4 is opened over the fuel injection period Tout, described in detail hereinafter, it is required to compensate for changes occurring in the amount of fuel actually injected from the injection due to variation in the differential pressure ÄPF even if the fuel injection period Tout is not changed. Further, the reason why the fuel pressure-dependent correction coefficient KPF is set as above in the range of ÄPF≦ÄPFL is that when the differential pressure ÄPF is equal to or lower than the value ÄPFL in the stratified combustion mode, the amount of fuel actually injected does not change as long as the fuel injection period Tout is not changed. On the other hand, the reason why the fuel pressure-dependent correction coefficient KPF is set as above in the range of ÄPF≧ÄPFREF is that when the differential pressure ÄPF is equal to or higher than the value ÄPFREF in the homogeneous combustion mode, the amount of fuel corresponding to the target air-fuel ratio is reliably injected by opening the injector 4 over the fuel injection period Tout. It should be noted that in the engine 3 of in-cylinder injection type of the present embodiment, the fuel pressure PF is very much higher than the internal cylinder pressure PCYL (e.g. the fuel pressure PF is one hundred times as high as the internal cylinder pressure PCYL), so that the fuel pressure PF may be used in place of the differential pressure ÄPF, as a parameter for use in calculating the fuel pressure-dependent correction coefficient KPF.

After the KPF-calculating process is executed as above, the program proceeds to a step S11 in FIG. 2, wherein a TiVB-calculating process is executed. In this process, an ineffective time-dependent correction term TiVB is calculated by retrieval from a table, not shown, according to the voltage value VB of the battery. The ineffective time-dependent correction term TiVB compensates for a delay time (ineffective time) until the injector 4 is actually opened for fuel injection.

Then, the program proceeds to a step S12, wherein a fuel behavior parameter-calculating process is executed. In this process, described in detail hereinafter, a direct ratio Ae and a take-off ratio Be are calculated as parameters indicative of behaviors of fuel.

Then, the program proceeds to a step S13, wherein the intake air temperature-dependent correction coefficient KTA, the atmospheric pressure-dependent correction coefficient KPA, the charging efficiency-dependent correction coefficient KETC, and the EGR-dependent correction coefficient KEGR are multiplied by each other to calculate a total correction coefficient Ktotal.

Then, the program proceeds to a step S14, wherein the basic fuel injection period Timap is multiplied by the total correction coefficient Ktotal, the final target air-fuel ratio coefficient KCMD, and the feedback correction coefficient KSTR to calculate a demanded fuel injection period Tcyl(i) on a cylinder-by-cylinder basis, by using the following equation (1):

$$Tcyl(i) = Timap \cdot Ktotal \cdot KCMD \cdot KSTR \tag{1}$$

The demanded fuel injection period Tcyl(i) corresponds to the amount of fuel demanded by each cylinder depending on the operating conditions of the engine 3. The symbol (i) of the demanded fuel injection period Tcyl(i) represents a cylinder number.

As is apparent from the equation (1), the demanded fuel injection period Tcyl(i) determining a demanded fuel amount dependent on the operating conditions of the engine 3 is calculated without using the fuel pressure-dependent correction coefficient KPF. The demanded fuel injection period Tcyl(i) by nature is irrelevant to the fuel pressure PF, so that the demanded fuel injection period Tcyl(i) can be properly calculated by excluding the fuel pressure-dependent correction coefficient KPF from the parameters used in the calculation.

Then, the program proceeds to a step S15, wherein the net fuel injection period Tnet(i) is calculated on a cylinder by cylinder basis by using the following equation (2):

$$Tnet(i) = (Tcyl(i) - Be \cdot TWP(i))/Ae \tag{2}$$

In the above equation, the net fuel injection period Tnet(i) represents a net fuel amount to be supplied to the combustion chamber 3c of each cylinder, which is determined based on the demanded fuel injection period Tcyl(i) by taking the direct ratio Ae and the carry-off ratio Be into account. TWP(i) represents an deposited-fuel amount-equivalent value (time period) equivalent to the amount of fuel deposited on the inner wall of the combustion chamber 3c of each cylinder.

As is apparent from this equation (2), the calculation of the net fuel injection period Tnet is carried out based on the demanded fuel injection period Tcyl and the deposited-fuel amount-equivalent value TWP, but the fuel pressure-dependent correction coefficient KPF is not used. As described above, the deposited fuel is burned within the combustion chamber 3c after being once deposited on the inner wall of the combustion chamber 3c, so that a proportion of an amount of burned fuel of the deposited fuel to the whole amount of deposited fuel is inherently indifferent to the fuel pressure. Therefore, by determining the net fuel injection period Tnet representative of the net amount of fuel to be injected from the injector 4 as described above, it is possible to properly determine the net fuel injection period Tnet by causing the operating conditions of the engine to be reflected therein, while taking the deposited fuel amount into account and at the same time excluding the influence of the fuel pressure.

FIG. 6 shows a TWP-calculating process for calculating the deposited-fuel amount-equivalent value TWP(i). This process is carried out in synchronism with inputting of the CRK signal on a cylinder-by-cylinder basis. In the process, in a step S100, the present value TWP(i)n of the deposited-fuel amount-equivalent value TWP(i) is calculated by the use of the following equation (3):

$$TWP(i)n = Tnet(i) \cdot (1 - Ae) + (1 - Be) \cdot TWP(i)n - 1 \tag{3}$$

wherein TWP(i)n−1 represents the immediately preceding value of the deposited-fuel amount-equivalent value TWP(i).

Referring again to FIG. 2, in a step S16 following the step S15, the fuel injection period Tout(i) is calculated for each cylinder by using the following equation (4):

$$Tout(i)=Tnet(i) \cdot KPF+TiVB \qquad (4)$$

where the fuel injection period Tout(i) is a time period over which the injector 4 should be opened and finally output from the ECU 2 to each injector 4 as the drive signal.

As is apparent from this equation (4), the fuel injection period Tout is calculated by correcting the net fuel injection period Tout by the fuel pressure-dependent correction coefficient KPF. Therefore, it is possible to appropriately compensate for variation in the amount of fuel actually injected from the injector 4 due to variation in the differential pressure ΔPF between the fuel pressure PF and the internal cylinder pressure PCYL. As a result, the fuel injection period Tout can be properly calculated by causing the fuel pressure and the fuel deposition to be appropriately reflected in the determination, whereby the accurate and optimum control of the actual fuel injection amount can be performed. This makes it possible to improve the convergence of the feedback control of the air-fuel ratio, for example, and thereby reduce exhaust emissions.

Then, in a step S17 following the step S16, the fuel injection timing θinj is calculated by the fuel injection timing-calculating process, followed by terminating the present program. Details of this process will be described hereinbelow.

Figure 5:
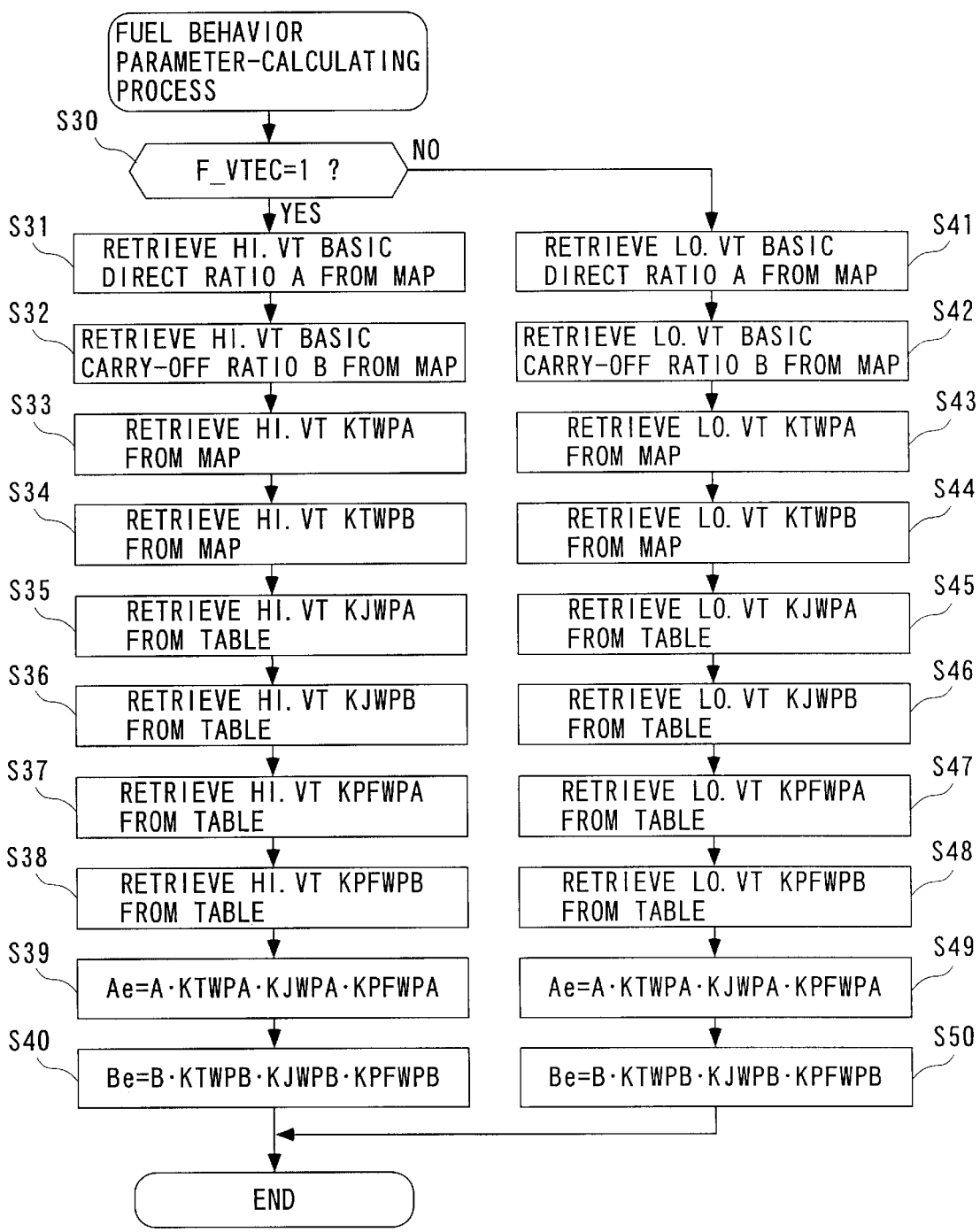
FIG. 5 is a flowchart showing a subroutine for carrying out a fuel behavior parameter-calculating process which is executed in a step S12 in FIG. 2.

Next, the fuel behavior parameter-calculating process executed in the step S12 will be described in detail with reference to FIG. 5. In this process, the direct ratio Ae and the carry-off ratio Be are calculated in the following manner: The direct ratio Ae represents a ratio of an amount of part of fuel which is injected from the injector 4 in the present combustion cycle, the part being actually burned in the present combustion cycle, to the whole amount of the injected fuel. On the other hand, the carry-off ratio Be represents a ratio of an amount of part of fuel deposited on the inner walls (cylinder surfaces, piston surfaces, etc.) of the combustion chamber 3c at an end of the immediately preceding combustion cycle, the part being actually burned in the present combustion cycle, to the whole amount of the deposited fuel.

More specifically, first, it is determined in a step S30 whether or not a flag $F_{13}$VTEC assumes 1. The flag F_VTEC is set to 1 when the valve timing is held at HI.VT by the VTEC 8, whereas when the valve timing is held at LO.VT, the flag F_VTEC is set to 0.

If the answer to the question of the step S30 is affirmative (YES), i.e. if the valve timing is held at HI.VT, the program proceeds to a step S31, wherein a basic direct ratio A for HI.VT is determined by retrieval from a map shown in FIG. 6 according to the engine rotational speed NE and the intake pipe absolute pressure PBA. In the map, the basic direct ratio A is set to a larger value as the engine rotational speed NE is higher and the intake pipe absolute pressure PBA is higher.

Then, the program proceeds to a step S32, wherein, similarly to the calculation of the basic direct ratio A in the step S31, a basic carry-off ratio B for HI.VT is determined by retrieval from a map similar to that shown in FIG. 6 according to the engine rotational speed NE and the intake pipe absolute pressure PBA. In the map, the carry-off ratio B is set such that it changes with a similar tendency to that of the basic direct ratio A, but is set to each individual value different from a corresponding value of the basic direct ratio A.

Then, the program proceeds to a step S33, wherein a coolant temperature-dependent correction coefficient KTWPA for use in correcting the basic direct ratio A for HI.VT is determined by retrieval from a map shown in FIG. 7 according to the engine coolant temperature TW and the intake pipe absolute pressure PBA. In the map, the coolant temperature-dependent correction coefficient KTWPA is set to a larger value as the engine coolant temperature TW is higher and the intake pipe absolute pressure PBA is higher.

Then, the program proceeds to a step S34, wherein, similarly to the coolant temperature-dependent correction coefficient KTWPA, a coolant temperature-dependent correction coefficient KTWPB for use in correcting the carry-off ratio B for HI.VT is determined by retrieval from a map similar to that shown in FIG. 7 according to the engine coolant temperature TW and the intake pipe absolute pressure PBA. In the map, the coolant temperature-dependent correction coefficient KTWPB is set such that it changes with a similar tendency to that of the coolant temperature-dependent correction coefficient KTWPA, but is set to each individual value different from a corresponding value of the correction coefficient KTWPA.

Figure 8:
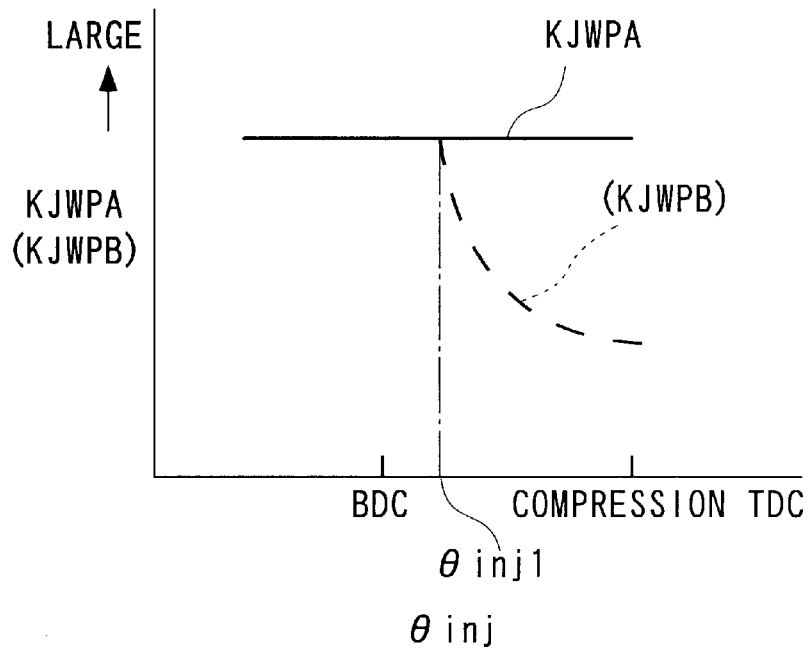
FIG. 8 shows an example of a table for use in calculating injection timing correction coefficients KJWPA, KJWPB in the FIG. 5 process.

Then, the program proceeds to a step S35, wherein an injection timing-dependent correction coefficient KJWPA for use in correcting the basic direct ratio A for HI.VT is determined by retrieval from a table shown in FIG. 8 according to the immediately preceding value of the fuel injection timing θinj determined in the step S17. As shown in the figure, in this table, the injection timing-dependent correction coefficient KJWPA is set to a constant value, irrespective of the fuel injection timing θinj.

Then, the program proceeds to a step S36, wherein, similarly to the calculation of the injection timing-dependent correction coefficient KJWPA, an injection timing-dependent correction coefficient KJWPB for use in correcting the carry-off ratio B for HI.VT is determined by retrieval from the FIG. 8 table according to the immediately preceding value of the fuel injection timing θinj determined in the step S17. As shown in the figure, in this table, when the fuel injection timing θinj is on an advanced side with respect to a predetermined crank angle θinj1 between a BDC position in a second half of each intake stroke and a TDC position in each compression stroke, the injection timing-dependent correction coefficient KJWPB is set to the same constant value as the injection timing-dependent correction coefficient KJWPA, whereas the injection timing-dependent correction coefficient KJWPB is set to a smaller value as the fuel injection timing θinj is more delayed with respect to the predetermined crank angle θinj1, i.e. as the fuel injection timing θinj is closer to the TDC position in each compression stroke. The reason why the injection timing-dependent correction coefficient KJWPB is thus set is that during the compression stroke of a piston, as the piston is closer to the TDC position, the internal cylinder pressure PCYL is increased, and hence it is difficult to vaporize fuel deposited on the inner walls of the combustion chamber 3c.

Figure 9:
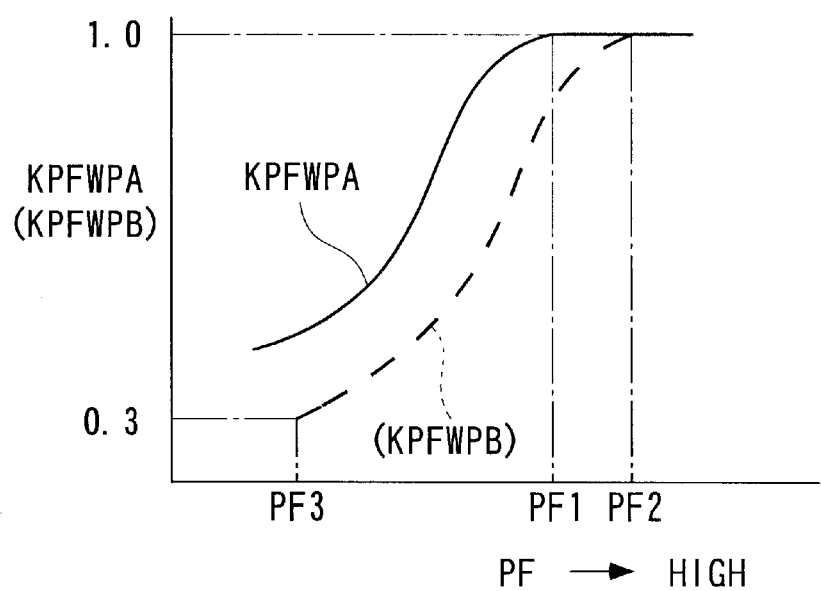
FIG. 9 shows an example of a table for use in calculating fuel pressure-dependent correction coefficients KPFWPA, KPFWPB in the FIG. 5 process.

Then, the program proceeds to a step S37, wherein a fuel pressure-dependent correction coefficient KPFWPA for use in correcting the basic direct ratio A for HI.VT is determined by retrieval from a table shown in FIG. 9 according to the fuel pressure PF. As shown in the figure, in this table, when the fuel pressure is lower than a predetermined value PF1, the fuel pressure-dependent correction coefficient KPFWPA is set to a larger value which is smaller than 1.0 as the fuel pressure PF is higher. The reason why the correction coefficient KPFWPA is thus set is that as the fuel pressure PF is lower, the degree of atomization of fuel is lower and hence more fuel tends to be deposited on the inner walls of the combustion chamber 3c, whereas as the fuel pressure PF is higher, the degree of atomization of fuel is higher and hence less fuel tends to be deposited on the same. On the other hand, when the fuel pressure PF is equal to or higher than the predetermined value PF1, the correction coefficient KPFWPA is set to 1.0. This is because the ratio of an amount of fuel deposited on the inner walls of the combustion chamber 3c to the whole amount of injected fuel is substantially constant when the fuel pressure PF is equal to or higher than the predetermined value PF1.

Then, the program proceeds to a step S38, wherein, similarly to the calculation of the correction coefficient KPFWPA, a fuel pressure-dependent correction coefficient KPFWPB for use in correcting the basic carry-off ratio B for HI.VT is determined by retrieval from the FIG. 9 table according to the fuel pressure PF. As shown in the figure, in this table, when the fuel pressure is lower than a predetermined value PF2, the fuel pressure-dependent correction coefficient KPFWPB is set to a larger value which is smaller than 1.0 as the fuel pressure PF is higher. The reason why the correction coefficient KPFWPB is thus set is that as the fuel pressure PF is higher, fuel deposited on the inner walls of the combustion chamber 3c is more readily removed therefrom and atomized. On the other hand, when the fuel pressure PF is equal to or higher than the predetermined value PF2, the correction coefficient KPFWPB is set to 1.0. This is because when the fuel pressure PF is equal to or higher than the predetermined value PF2, the ratio of an amount of part of the fuel deposited on the inner walls of the combustion chamber 3c, which part is actually burned in the present combustion cycle, to the whole amount of the deposited fuel, remains unchanged.

Then, the program proceeds to a step S39, wherein the direct ratio Ae is calculated by multiplying the basic direct ratio A determined as above by the coolant temperature-dependent correction coefficient KTWPA, the injection timing-dependent correction coefficient KJWPA, and the fuel pressure-dependent correction coefficient KPFWPA.

Then, the program proceeds to a step S40, wherein, similarly to the direct ratio Ae, the carry-off ratio Be is calculated by multiplying the basic carry-off ratio B by the coolant temperature-dependent correction coefficient KTWPB, the injection timing-dependent correction coefficient KJWPB, and the fuel pressure-dependent correction coefficient KPFWPB.

On the other hand, if the answer to the question of the step S30 is negative (NO), i.e. if the valve timing is held at LO.VT, a direct ratio Ae and a carry-off ratio Be for LO.VT are calculated by the following steps S41 to 50 similarly to the steps S31 to 40, followed by terminating the program. In this case, maps and tables used in the steps S41 to 48 are set such that they each exhibit similar tendency to a corresponding one of the maps and tables used for calculation of the direct ratio Ae and the carry-off ratio Be for HI.VT, but have different corresponding values.

As described above, the direct ratio Ae and the carry-off ratio Be are determined by correcting the basic direct ratio A and the basic carry-off ratio B, respectively, by the fuel pressure-dependent correction coefficients KPFWPA, KPFWPB determined based on the fuel pressure PF. Then, the deposited-fuel amount-equivalent value TWP corresponding to the amount of deposited fuel is calculated by the use of the corrected direct ratio Ae and carry-off ratio Be. Since the fuel pressure PF and the deposited-fuel amount-equivalent value TWP are closely related to each other as described hereinabove with reference to the FIG. 9 table, it is possible to properly calculate the deposited-fuel amount-equivalent value TWP on a cylinder-by-cylinder basis such that the deposited-fuel amount-equivalent value TWP reflects the fuel pressure PF, by using the direct ratio Ae and the carry-off ratio Be determined by employing the calculation method described above. Further, since the basic direct ratio A and the basic carry-off ratio B are calculated separately according to the valve timing (LO.VT or HI.VT), it is possible to calculate the deposited-fuel amount-equivalent value TWP more appropriately in response to changes in the amount of intake air and the fuel injection timing θinj caused by switching of the valve timing.

Figure 10:
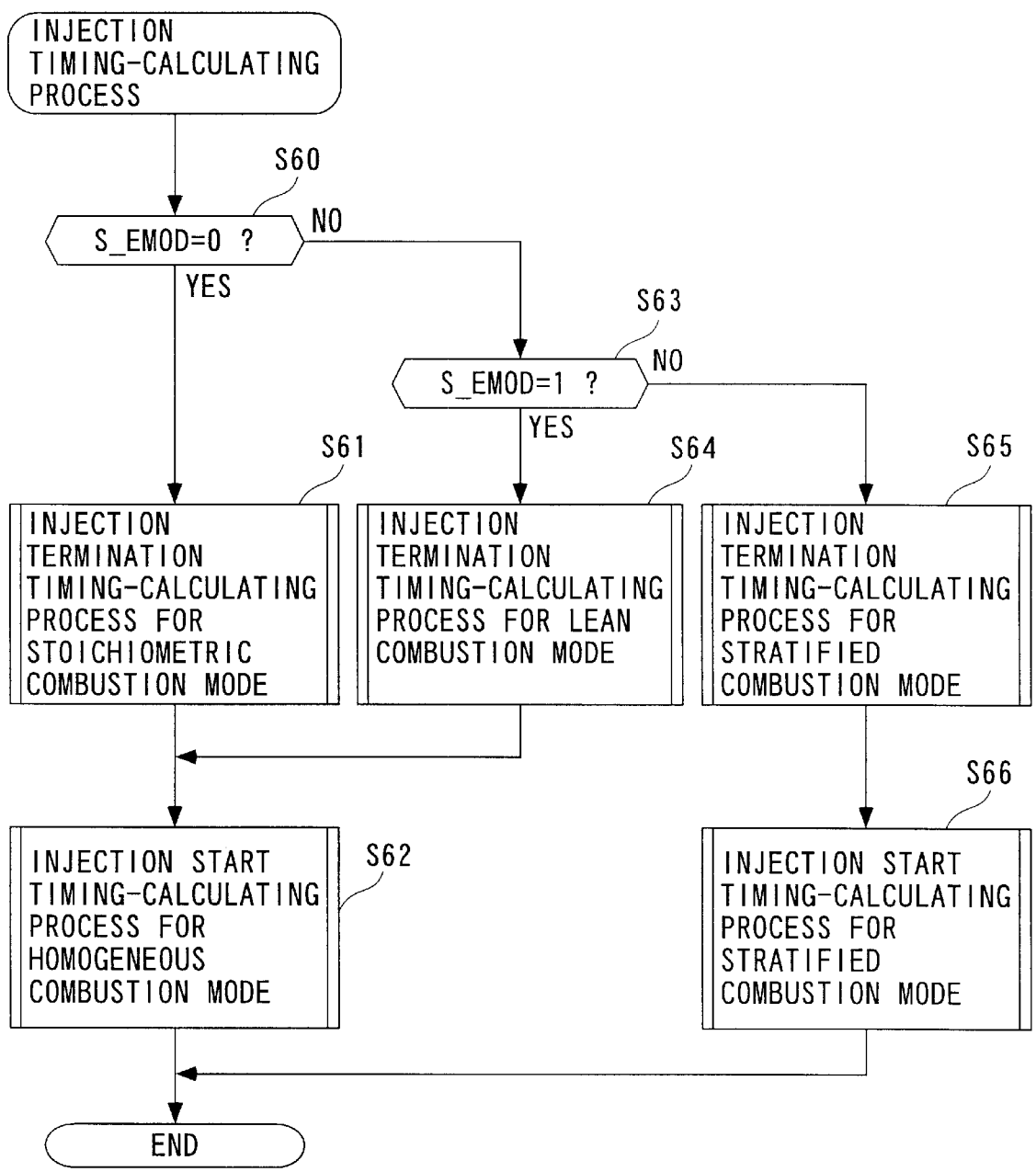
FIG. 10 is a flowchart showing a subroutine for carrying out an injection timing-calculating process which is executed in a step S17 in FIG. 2.
Figure 11:
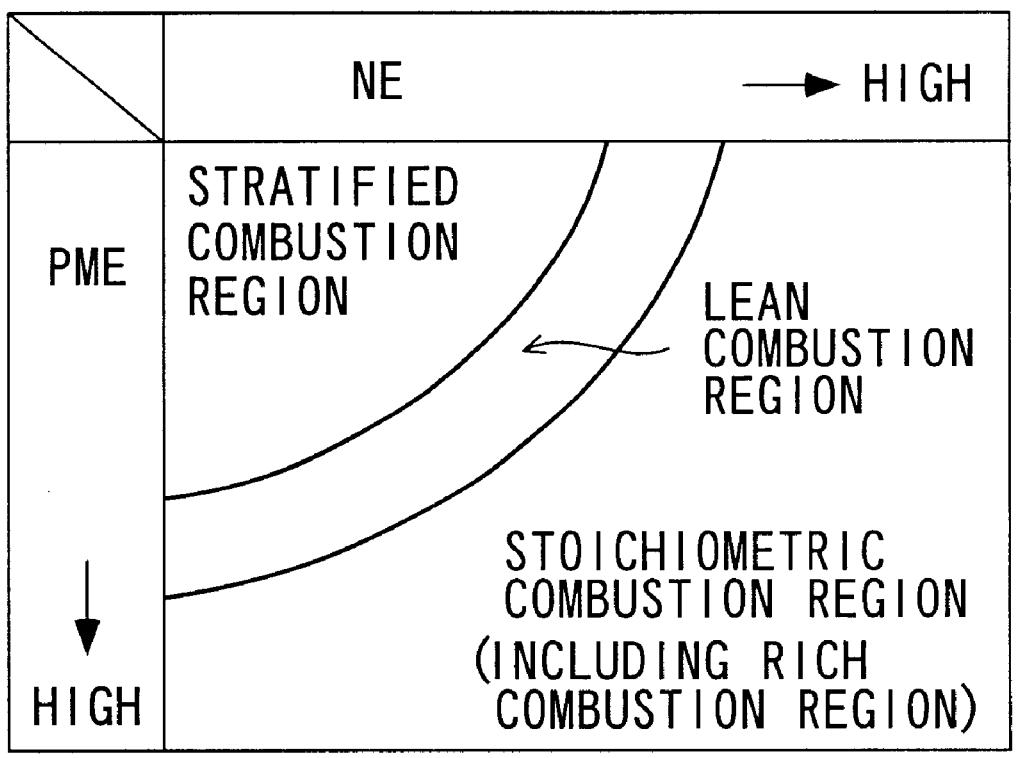
FIG. 11 shows a map for use in determining a value of a monitor S_EMOD in FIG. 10.

Next, the injection timing-calculating process executed in the step S17 will be described with reference to FIGS. 10 to 15. FIG. 10 shows a main routine for carrying out the injection timing-calculating process. As shown in the figure, in this process, first, it is determined in a step S60 whether or not a combustion mode monitor S_EMOD assumes 0.

The combustion mode monitor S_EMOD indicates which of the stratified combustion mode, the lean combustion mode included in the homogeneous combustion mode, and the stoichiometric combustion mode included in the homogeneous combustion mode, the engine 3 is in. The value of the combustion mode monitor S_EMOD is set by retrieval from a map illustrated in FIG. 11 according to the demanded torque PME determined in the step S5 and the engine rotational speed NE. More specifically, in the map, the value is set to "2" for a stratified combustion region, set to 1 for a lean combustion region, and set to 0 for a stoichiometric combustion region. The stoichiometric combustion region defined in the map is mainly formed by a region in which the air-fuel ratio of an air-fuel mixture is controlled to the stoichiometric air-fuel ratio, but also includes a region in which the air-fuel ratio of the mixture is controlled to values richer than the stoichiometric air-fuel ratio. Therefore, in the following description, "the stoichiometric combustion (mode)" is intended to include the rich combustion (mode).

If the answer to the question of the step S60 is affirmative (YES), i.e. if S_EMOD=0 holds, which means that the engine 3 is being operated in the stoichiometric combustion mode, the program proceeds to a step S61, wherein an injection termination timing-calculating process for the stoichiometric combustion mode is executed. In this process, which will be described in detail hereinafter, an injection termination timing IJLOGH of the fuel injection timing θinj for the stoichiometric combustion mode is calculated.

Then, the program proceeds to a step S62, wherein an injection start timing-calculating process for the homogeneous combustion mode is executed, followed by terminating the program. In this process, an injection start timing of the fuel injection timing θinj is calculated back from the injection termination timing IJLOGH determined in the step S61 in FIG. 2 by using the fuel injection period Tout determined in the step S15. The injection start timing and the injection termination timing IJLOGH are both calculated as respective crank angle positions with respect to the TDC position in each intake stroke.

On the other hand, if it is determined in the step S60 that S_EMOD≠0 holds, the program proceeds to a step S63, wherein it is determined whether or not the combustion mode monitor S_EMOD assumes 1. If the answer to the question is affirmative (YES), i.e. if S_EMOD=1 holds, which means that the engine 3 is being operated in the lean combustion mode included in the homogenous combustion mode, the program proceeds to a step S64, wherein an injection termination timing-calculating process for the lean combustion mode, described in detail hereinafter, is executed to calculate an injection termination timing IJLOGH of the fuel injection timing θinj for the lean combustion mode.

Then, the program proceeds to the step S62, wherein the injection start timing of the fuel injection timing θinj is calculated based on the injection termination timing IJLOGH determined in the step S64 and the fuel injection period Tout, followed by terminating the program. In the steps S62, S64, similarly to the steps S61, S64, the injection start timing and the injection termination timing IJLOGH are both calculated as respective crank angle positions with respect to the TDC position in each intake stroke.

On the other hand, if the answer to the question of the step S63 is negative (NO), i.e. if S_EMOD=2 holds, which means that the engine 3 is being operated in the stratified combustion mode, the program proceeds to a step S65, wherein an injection termination timing-calculating process for the stratified combustion mode is executed to calculate an injection termination timing IJLOGH of the fuel injection timing θinj for the stratified combustion mode, similarly to the step S61, S64.

Then, the program proceeds to a step S66, wherein, similarly to the step S62, the injection start timing for the stratified combustion mode is calculated based on the injection termination timing IJLOGH determined in the step S65 and the fuel injection period Tout, followed by terminating the program. In the steps S65, S66, differently from the steps S61, S62, S64, the injection start timing and the injection termination timing IJLOGH are both calculated as respective crank angle positions with respect to the TDC position in each compression stroke.

Next, the injection termination timing-calculating process for the stoichiometric combustion mode, which is executed in the step S61, will be described with reference to FIG. 12. In the process, as described below, the injection termination timing IJLOGH of the fuel injection timing θinj is calculated on a cylinder-by-cylinder basis, as a crank angle position after TDC (ATDC) of the intake stroke.

In the process, first, in a step S70, a coolant temperature-dependent correction term IJTW is determined. More specifically, the coolant temperature-dependent correction term IJTW is determined by retrieval from a TW-IJTW table shown in FIG. 13, according to the engine coolant temperature TW. As shown in the figure, in the TW-IJTW table, the coolant temperature-dependent correction term IJTW is set to a smaller value as the engine coolant temperature TW is higher. The correction term IJTW is thus set so as to generate torque efficiently by advancing the injection termination timing IJLOGH of the fuel injection timing θ inj since fuel injected into the combustion chamber 3c is easier to ignite and more efficient homogeneous combustion is carried out as the engine coolant temperature TW is higher.

Figure 12:
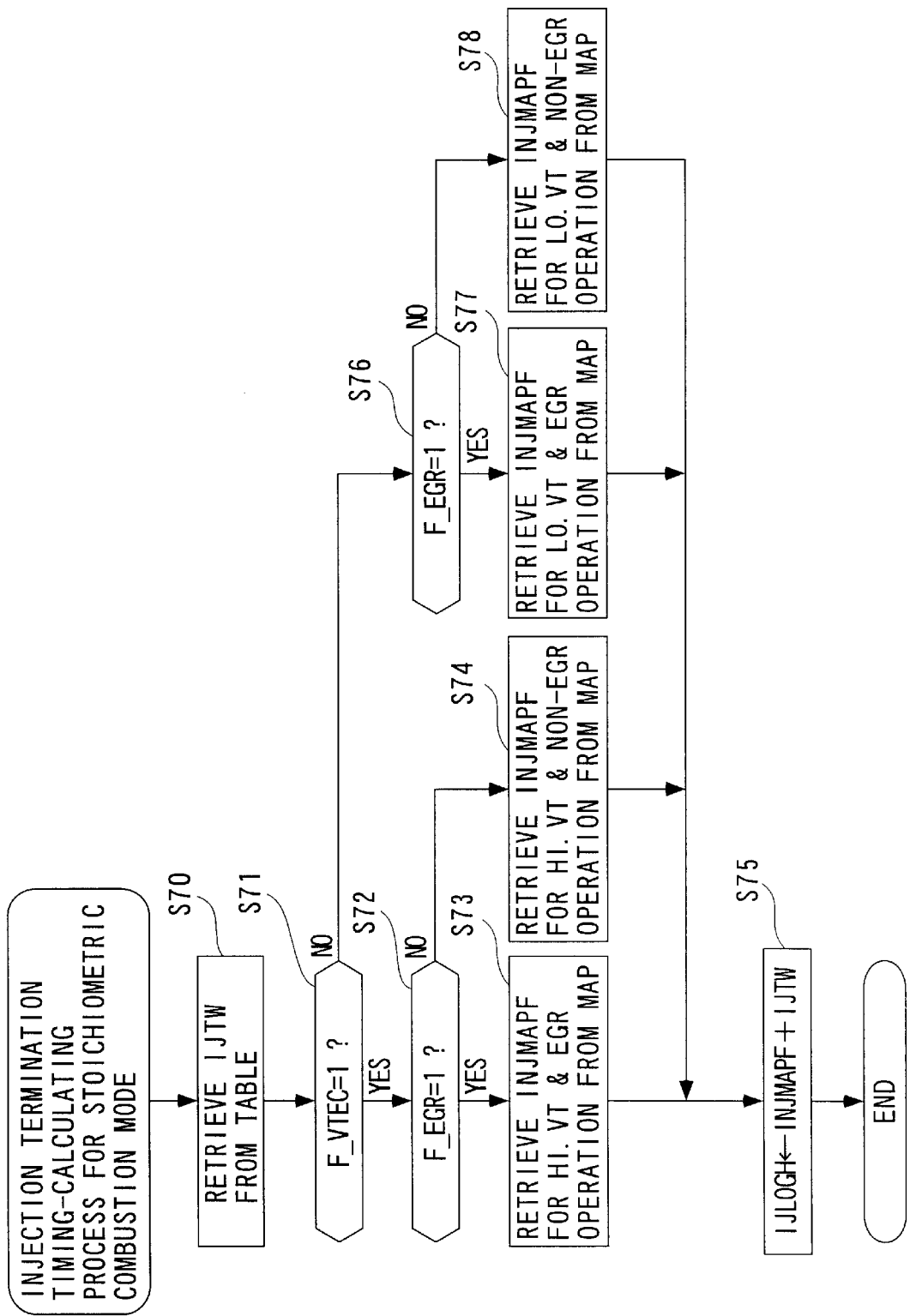
FIG. 12 is a flowchart showing a subroutine for carrying out an injection termination timing-calculating process for a stoichiometric combustion mode in FIG. 10.

Then, in a step S71 in FIG. 12, it is determined whether or not the flag F_VTEC assumes 1. If the answer to the question is affirmative (YES), i.e. if the valve timing is held at HI.VT, the program proceeds to a step S72, wherein it is determined whether or not an EGR execution flag F_EGR assumes 1. The flag F_EGR is set to 1 when the EGR pipe 11 is opened by the EGR control valve 12 for execution of the EGR operation, whereas when the EGR pipe 11 is closed to inhibit the execution of EGR operation, the flag F_EGR is set to 0.

If the answer to the question of the step S72 is affirmative (YES), i.e. if the EGR operation is being executed, the program proceeds to a step S73, wherein a basic injection termination timing INJMAPF for HI.VT & EGR operation is determined by retrieval from a map, not shown, according to the engine rotational speed NE and the fuel injection period Tout(i) calculated in the step S16 in FIG. 2 for each cylinder, on a cylinder-by-cylinder basis.

Then, the program proceeds to a step S75, and the injection termination timing IJLOGH is set to a value calculated by adding the coolant temperature-dependent correction term IJTW determined in the step S70 to the basic injection termination timing INJMAPF, followed by terminating the program. Thus, the injection termination timing IJLOGH for HI.VT & EGR operation is determined on a cylinder-by-cylinder basis.

On the other hand, if the answer to the question of the step S72 is negative (NO), i.e. if EGR operation is not being executed, the program proceeds to a step S74, wherein a basic injection termination timing INJMAPF for HI.VT & Non-EGR operation is determined by retrieval from a map, not shown, similarly to the step S73, according to the engine rotational speed NE and the fuel injection period Tout(i) for each cylinder, on a cylinder-by-cylinder basis. Then, in the step S75, an injection termination timing IJLOGH for HI.VT & Non-EGR operation is calculated for each cylinder, followed by terminating the program.

If the answer to the question of the step S71 is negative (NO), i.e. if the valve timing is held at LO.VT, the program proceeds to a step S76, wherein it is determined whether or not the EGR execution flag F_EGR assumes 1.

If the answer to this question is affirmative (YES), i.e. if EGR operation is being carried out, the program proceeds to a step S77, wherein similarly to the step S73, a basic injection termination timing INJMAPF for LO.VT & EGR operation is retrieved from a map, not shown, according to the engine rotational speed NE and the fuel injection period Tout(i) for each cylinder, on a cylinder-by-cylinder basis. Then, the program proceeds to the step S75, wherein an injection termination timing IJLOGH for LO.VT & EGR operation is calculated on a cylinder-by-cylinder basis, followed by terminating the program.

On the other hand, if the answer to the question of the step S76 is negative (NO), i.e. if the EGR operation is not being carried out, the program proceeds to a step S78, wherein similarly to the step S73, a basic injection termination timing INJMAPF for LO.VT & Non-EGR operation is determined by retrieval from a map, not shown, according to the engine rotational speed NE and the fuel injection period Tout(i) for each cylinder, on a cylinder-by-cylinder basis. Then, the program proceeds to the step S75, wherein an injection termination timing IJLOGH for LO.VT & Non-EGR operation is calculated on a cylinder-by-cylinder basis, followed by terminating the present program.

Figure 14:
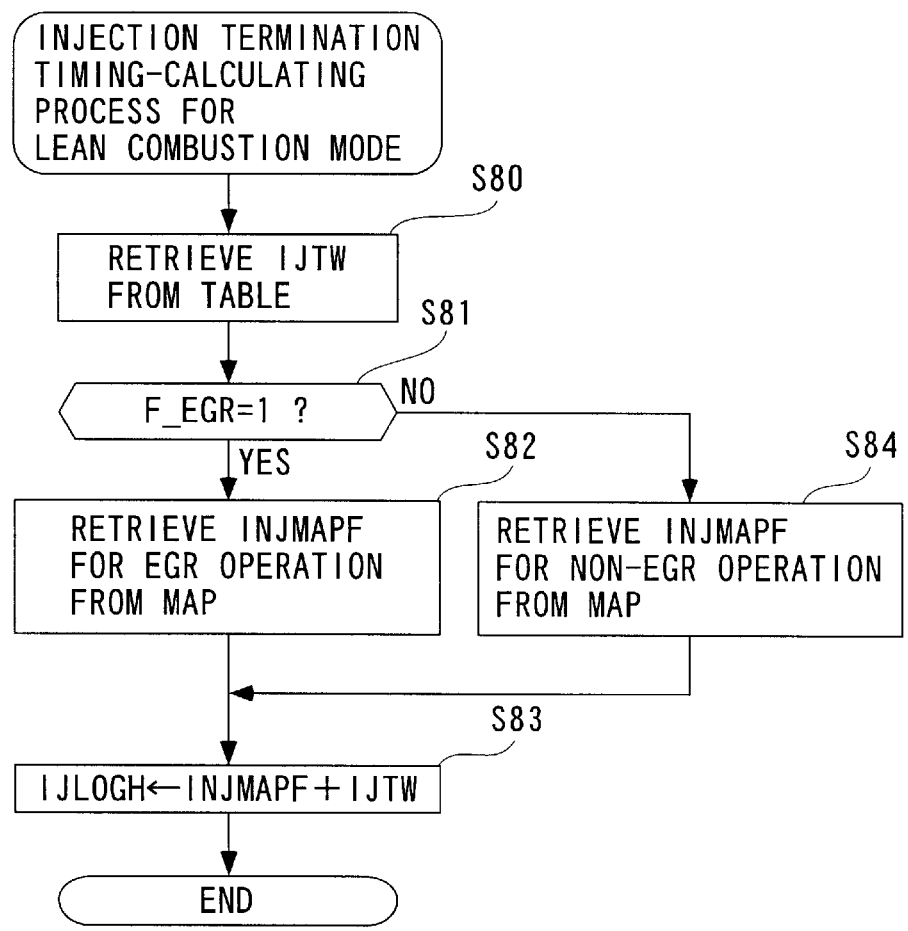
FIG. 14 is a flowchart showing a subroutine for carrying out an injection termination timing-calculating process for a lean combustion mode in FIG. 10.

Next, the injection termination timing-calculating process for the lean combustion mode, which is executed in the step S64, will be described with reference to FIG. 14. In this process, similarly to the injection termination timing for the stoichiometric combustion mode, the injection termination timing IJLOGH is calculated as a crank angle position after TDC during the intake stroke of each piston.

Figure 13:
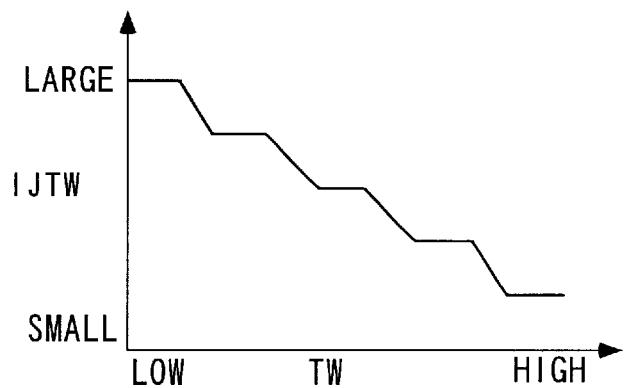
FIG. 13 shows an example of a table for use in calculating IJTW in a step S70 in FIG. 12 and in a step S80 in FIG. 14.

In the process, first, in a step S80, similarly to the step S70, a coolant temperature-dependent correction term IJTW is determined by retrieval from the FIG. 13 TW-IJTW table according to the engine coolant temperature TW.

Then, the program proceeds to a step S81, wherein it is determined whether or not the EGR execution flag F_EGR assumes 1. If the answer to the question is affirmative (YES), i.e. if EGR operation is being carried out, the program proceeds to a step S82, wherein a basic injection termination timing INJMAPF for EGR operation is determined by retrieval from a map, not shown, according to the engine rotational speed NE and the fuel injection period Tout(i) for each cylinder, on a cylinder-by-cylinder basis.

Then, the program proceeds to a step S83, and the injection termination timing IJLOGH is set to a value calculated by adding the coolant temperature-dependent correction term IJTW determined in the step S80 to the basic injection termination timing INJMAPF, followed by terminating the program. Thus, the injection termination timing IJLOGH for EGR operation is calculated for each cylinder.

On the other hand, if the answer to the question of the step S81 is negative (NO), i.e. if EGR operation is not being carried out, the program proceeds to a step S84, wherein a basic injection termination timing INJMAPF for Non-EGR operation is determined by retrieval from a map, not shown, similarly to the step S82, according to the engine rotational speed NE and the fuel injection period Tout(i) for each cylinder, on a cylinder-by-cylinder basis. Then, the program proceeds to the step S83, wherein an injection termination timing IJLOGH for Non-EGR operation is calculated for each cylinder, followed by terminating the program.

Figure 15:
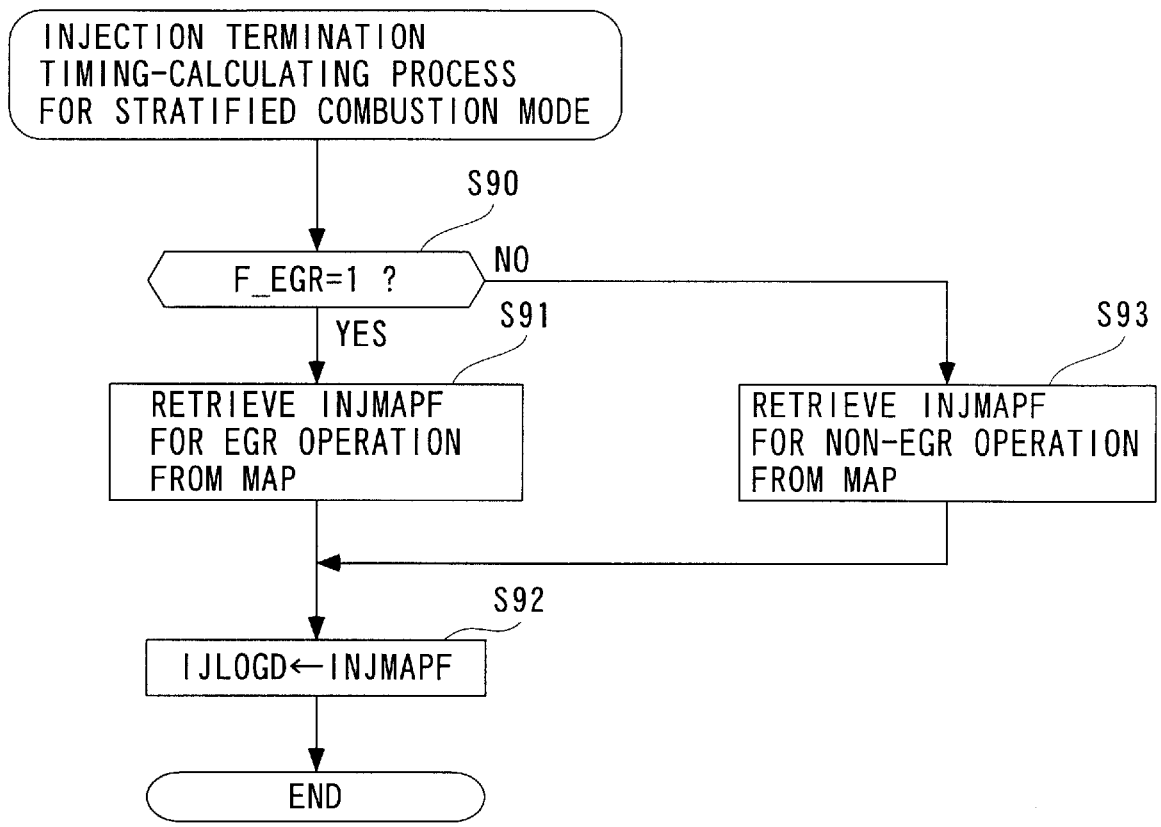
FIG. 15 is a flowchart showing a subroutine for carrying out an injection termination timing-calculating process for a stratified combustion mode in FIG. 10.
Figure 16:
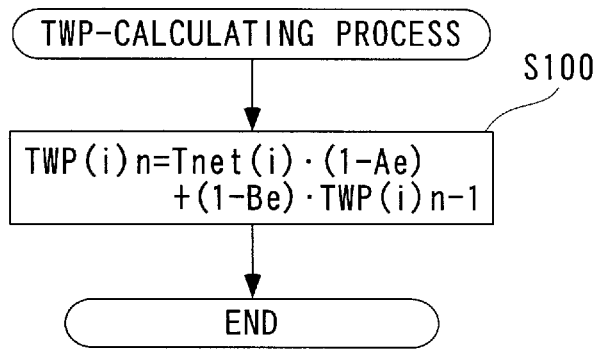
FIG. 16 is a flowchart of a TWP-calculating process.

Next, the injection termination timing-calculating process for the stratified combustion mode, which is executed in the step S65, will be described with reference to FIG. 15. In the process, differently from the injection termination timing for the stoichiometric combustion mode or for the lean combustion mode, the injection termination timing IJLOGH is calculated as a crank angle position after TDC of the compression stroke of each piston.

In the process, first, it is determined in a step S90 whether or not the EGR execution flag F_EGR assumes 1. If the answer to the question is affirmative (YES), i.e. if EGR operation is being carried out, the program proceeds to a step S91, wherein a basic injection termination timing INJMAPF for EGR operation is determined by retrieval from a map, not shown, according to the engine rotational speed NE and the fuel injection period Tout(i) for each cylinder, on a cylinder-by-cylinder basis.

Then, the program proceeds to a step S92, wherein the injection termination timing IJLOGH is set to the basic injection termination timing INJMAPF for each cylinder, followed by terminating the program.

On the other hand, if the answer to the question of the step S90 is negative (NO), i.e. if EGR operation is not being carried out, the program proceeds to a step S93, wherein a basic injection termination timing INJMAPF for Non-EGR operation is determined by retrieval from a map, not shown, similarly to the step S91, according to the engine rotational speed NE and the fuel injection period Tout(i) for each cylinder, on a cylinder-by-cylinder basis. Then, in the step S92, an injection termination timing IJLOGH for Non-EGR operation is calculated for each cylinder, followed by terminating the program.

As described above, according to the present embodiment, in calculating the fuel injection period Tout, the demanded fuel injection period Tcyl is corrected by the fuel pressure-dependent correction coefficient KPF. This makes it possible to properly compensate for variation in the amount of fuel actually injected from the injector 4 dependent on the differential pressure $\Delta$PF between the fuel pressure PF and the internal cylinder pressure PCYL. On the other hand, the deposited-fuel amount-equivalent value TWP is not corrected by the fuel pressure-dependent correction coefficient KPF, and hence the fuel injection period Tout can be properly calculated by excluding influence of the coefficient in the calculation. As a result, it is possible to accurately determine the fuel injection period Tout such that fuel pressure and fuel deposition are appropriately reflected therein, thereby perform accurate and optimum control of the actual fuel injection amount.

It should be noted that the invention is not limited to above embodiment described above, but can be practiced in various forms. For example, although the internal combustion engine described in the embodiment is an in-cylinder injection type which injects fuel from a fuel injection valve directly into a combustion chamber, this is not limitative, but it goes without saying that the invention can be applied to an internal combustion engine of an intake port injection type which injects fuel to an intake port. This makes it possible to obtain the advantageous effects described in the embodiment, by causing the fuel pressure and the deposition of fuel on the intake port to be appropriately reflected in the calculation.

It is further understood by those skilled in the art that the foregoing is a preferred embodiment of the invention, and that various changes and modifications may be made without departing from the spirit and scope thereof.

What is claimed is:

1. A fuel injection control system for an internal combustion engine, for controlling the amount of fuel to be injected from a fuel injection valve, by a fuel injection period during which the fuel injection valve is opened for fuel injection, the fuel injection control system comprising:

operating condition-detecting means for detecting operating conditions of the engine;

demanded fuel amount-determining means for determining an amount of fuel demanded by the engine, according to the detected operating conditions of the engine;

deposited fuel amount-determining means for determining, out of an amount of fuel injected from the fuel injection valve, an amount of fuel deposited on walls downstream of the fuel injection valve, according to the detected operating conditions;

net fuel amount-determining means for determining a net amount of fuel to be injected from the fuel injection valve, based on the determined demanded amount of fuel and the determined deposited amount of fuel;

fuel pressure-determining means for determining pressure of fuel to be injected from the fuel injection valve; and fuel injection period-determining means for determining the fuel injection period by correcting the determined net amount of fuel according to the determined pressure of fuel.

2. A fuel injection control system according to claim 1, wherein the engine includes a cylinder defining a combustion chamber therein, and wherein the fuel injection valve is arranged such that fuel is injected directly into the combustion chamber of the cylinder.

3. A fuel injection control system according to claim 2, wherein said fuel pressure-determining means includes supply fuel pressure-detecting means for detecting pressure of the fuel supplied to the fuel injection valve, and internal cylinder pressure-determining means for determining pressure within the combustion chamber, and determines the pressure of fuel as a difference between the pressure of fuel detected by said fuel pressure-detecting means and the pressure within the combustion chamber determined by said internal cylinder pressure-determining means.

4. A fuel injection control system according to claim 3, wherein said internal cylinder pressure-determining means includes crank angle-detecting means for detecting a crank angle of the engine, and determines the pressure within the combustion chamber according to the detected crank angle.

5. A fuel injection control method for an internal combustion engine, for controlling the amount of fuel to be injected from a fuel injection valve, by a fuel injection period during which the fuel injection valve is opened for fuel injection, the fuel injection control method comprising the steps of:
detecting operating conditions of the engine;
determining an amount of fuel demanded by the engine, according to the detected operating conditions of the engine;
determining, out of an amount of fuel injected from the fuel injection valve, an amount of fuel deposited on walls downstream of the fuel injection valve, according to the detected operating conditions;
determining a net amount of fuel to be injected from the fuel injection valve, based on the determined demanded amount of fuel and the determined deposited amount of fuel;
determining pressure of fuel to be injected from the fuel injection valve; and
determining the fuel injection period by correcting the determined net amount of fuel according to the determined pressure of fuel.

6. A fuel injection control method according to claim 5, wherein the engine includes a cylinder defining a combustion chamber therein, and wherein the fuel injection valve is arranged such that fuel is injected directly into the combustion chamber of the cylinder.

7. A fuel injection control method according to claim 6, wherein the step of determining the pressure of fuel includes the steps of detecting pressure of the fuel supplied to the fuel injection valve, determining pressure within the combustion chamber, and determining the pressure of fuel as a difference between the detected pressure of fuel and the determined pressure within the combustion chamber.

8. A fuel injection control method according to claim 7, wherein the step of determining the pressure within the combustion chamber includes detecting a crank angle of the engine, and determining the pressure within the combustion chamber according to the detected crank angle.

9. An engine control unit including a control program for causing a computer to carry out fuel injection control for controlling an amount of fuel to be injected into an internal combustion engine from a fuel injection valve, by a fuel injection period during which the fuel injection valve is opened for fuel injection, wherein the control program causes the computer to detect operating conditions of the engine, determine an amount of fuel demanded by the engine, according to the detected operating conditions of the engine, determine, out of an amount of fuel injected from the fuel injection valve, an amount of fuel deposited on walls downstream of the fuel injection valve, according to the detected operating conditions, determine a net amount of fuel to be injected from the fuel injection valve, based on the determined demanded amount of fuel and the determined deposited amount of fuel, determine pressure of fuel to be injected from the fuel injection valve, and determine the fuel injection period by correcting the determined net amount of fuel according to the determined pressure of fuel.

10. An engine control unit according to claim 9, wherein the engine includes a cylinder defining a combustion chamber therein, and wherein the fuel injection valve is arranged such that fuel is injected directly into the combustion chamber of the cylinder.

11. An engine control unit according to claim 10, wherein when the control program causes the computer to determine the pressure of fuel, the control program causes the computer to detect pressure of the fuel supplied to the fuel injection valve, determine pressure within the combustion chamber, and determine the pressure of fuel as a difference between the detected pressure of fuel and the determined pressure within the combustion chamber.

12. An engine control unit according to claim 11, wherein when the control program causes the computer to determine the pressure within the combustion chamber, the control program causes the computer to detect a crank angle of the engine, and determine the pressure within the combustion chamber according to the detected crank angle.

* * * * *